United States Patent [19]

Craig

[11] 4,254,542
[45] Mar. 10, 1981

[54] CONSTRUCTION NUT AND BOLT ASSEMBLY AND METHOD OF ERECTING STRUCTURAL STEEL

[76] Inventor: Gerald V. Craig, Box 40A, Birneys Star Route, Sheridan, Wyo. 82801

[21] Appl. No.: 28,971

[22] Filed: Apr. 11, 1979

[51] Int. Cl.³ .................. B23Q 3/00; B25B 27/14; F16B 35/00
[52] U.S. Cl. ............................ 29/464; 29/271; 29/526 R; 403/408; 411/368; 411/401
[58] Field of Search .................. 29/526 R, 464, 271; 85/1 P; 403/408

[56] References Cited

U.S. PATENT DOCUMENTS

| | | | |
|---|---|---|---|
| 2,768,434 | 10/1966 | Taylor | 29/526 R |
| 3,962,775 | 6/1976 | King | 29/526 R X |
| 4,005,629 | 2/1977 | Franklin | 85/1 P |
| 4,014,089 | 3/1977 | Sato et al. | 29/526 R |

FOREIGN PATENT DOCUMENTS

| | | | |
|---|---|---|---|
| 664555 | 6/1963 | Canada | 403/408 |
| 1338898 | 8/1963 | France | 85/1 P |

*Primary Examiner*—Charlie T. Moon
*Attorney, Agent, or Firm*—Hill, Van Santen, Steadman, Chiara & Simpson

[57] ABSTRACT

A combination structural steel erection bolt, drift pin and nut assembly replaces heretofore required long erection bolts and drift pins or pry bars in erecting floor beams to upright columns of steel framework for buildings and the like to form the initial connection between the floor beams and columns and to align the bolt holes for receiving the permanent bolts. The assemblies of this invention include a bolt having a head with an elongated shank divided into an enlarged diameter smooth surfaced grip portion adjacent the head to snugly fit the bolt holes, a tapered central portion for directing the structural steel elements to the grip portion, and an elongated externally threaded portion projecting from the small end of the tapered portion for freely fitting into the bolt holes. A sleeve loosely embraces the shank and a nut threaded on the threaded portion of the shank forces the sleeve against a structural element causing it to ride up the tapered portion to the grip portion thereby aligning the holes of the structural elements that are to be bolted together. When the structural elements are thus drawn together the other bolt holes on these elements are aligned and shorter permanent bolts are then used to permanently secure the elements together. The combination nut and bolt assembly of this invention is then removed for reuse.

6 Claims, 9 Drawing Figures

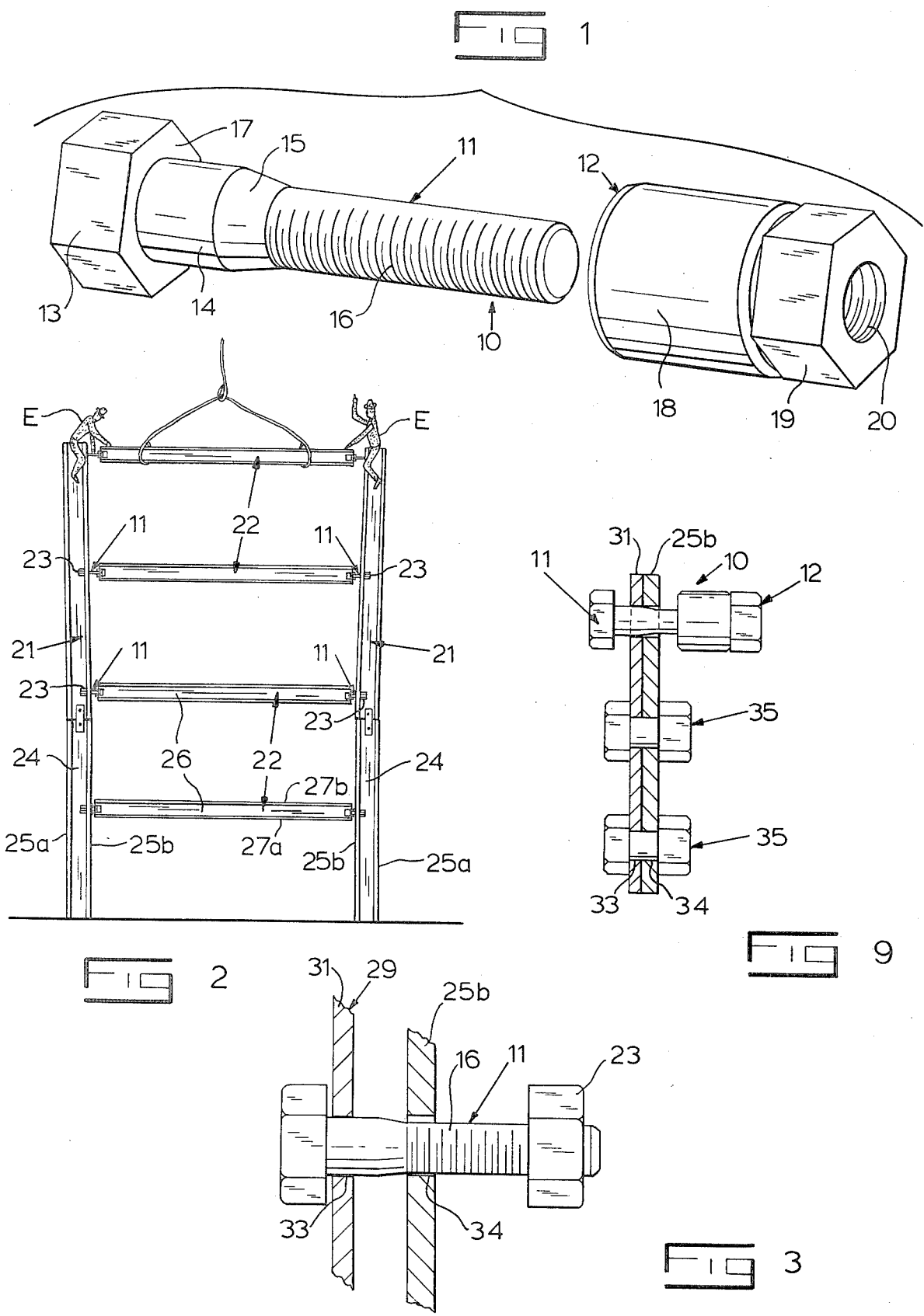

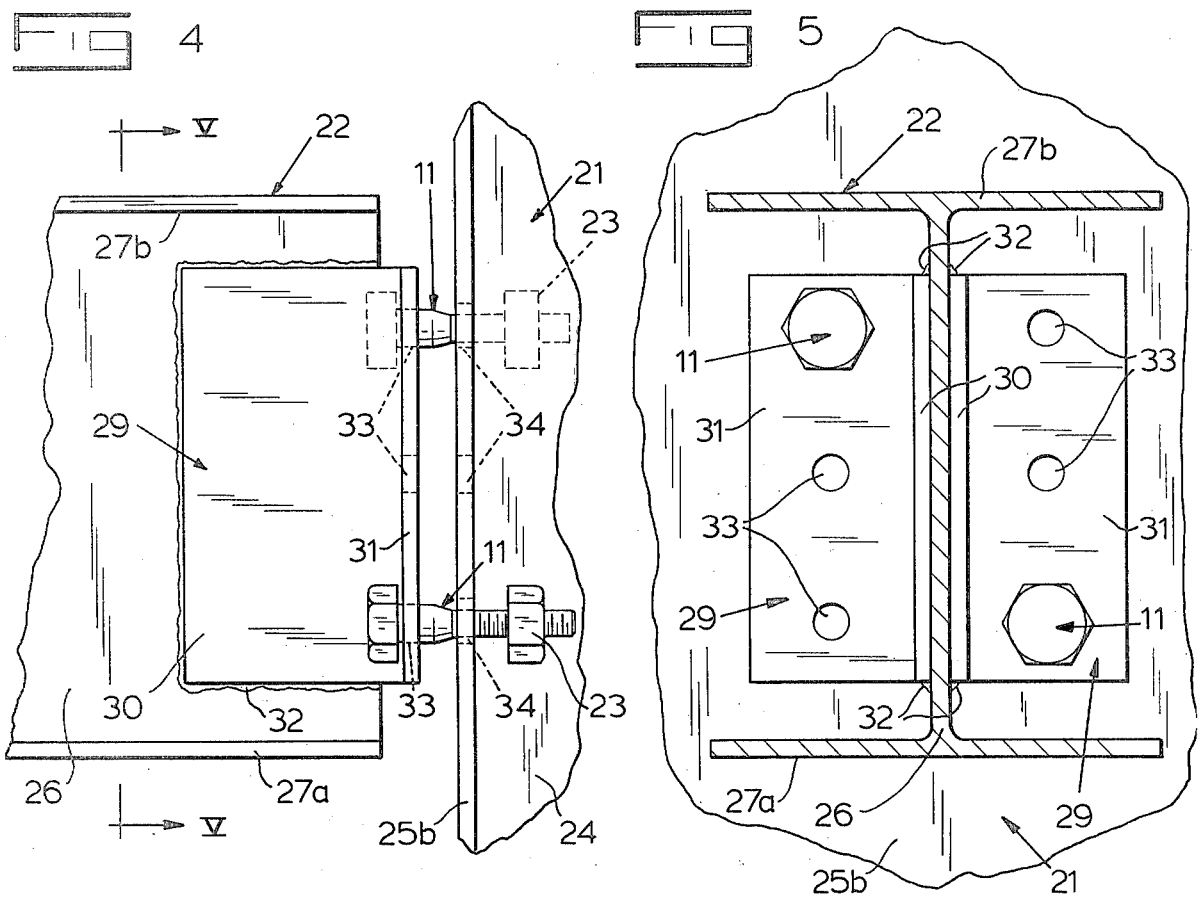
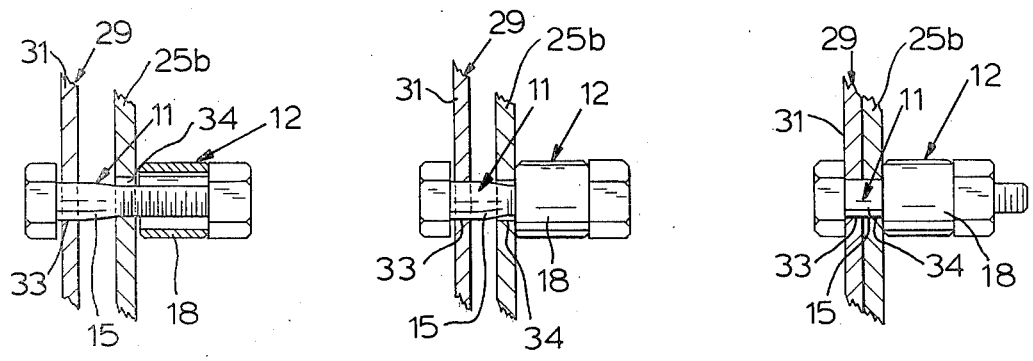
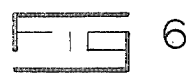  

CONSTRUCTION NUT AND BOLT ASSEMBLY AND METHOD OF ERECTING STRUCTURAL STEEL

FIELD OF THE INVENTION

This invention relates to the art of "hanging the iron" in erecting structural steel elements such as columns and floor beams of supporting framework for buildings and the like. Specifically the invention deals with a nut and bolt assembly that replaces heretofore required separate erection bolts and drift pins or pry bars in the bolting of floor beams to upright columns in building constructions.

PRIOR ART

In modern steel structures for buildings and the like, high strength bolting has supplanted riveting as a most common method of connecting the individual structural members. Since the thicknesses of these steel members vary considerably a detailed listing of both number and size of bolts must be made for each connection. A bolt which is too short for a particular connection will not develop the necessary strength whereas a bolt that is too long could interfere with other structural members or other bolts in the same connection.

A typical high strength bolt for steel structure has a specified diameter, a grip portion on the shank equal in length to the total thickness of the members to be connected and a threaded shank portion beyond the grip portion long enough to project slightly beyond a nut threaded thereon which is tightened to its final position.

Since most steel building structures have two, and sometimes three floors attached to a single column the lower floor beams must be initially erected in a very loose condition to allow the columns to sway for wedging the upper floor beams therebetween. Since the permanent bolt can not have a length accommodating such loose connections, elongated erection bolts are initially used to hang the floor systems to the columns with usually only two such bolts being sufficient to hold the floor systems until the bolt-up crew follows the erection crew for the final bolting together of the structural elements. Usually the bolt-up crew does not start until all of the floor steel has been erected for any particular column tier.

The bolt-up crew first drives drift pins into the open holes of the connection to align all holes for acceptance of the permanent bolts which are designed for that particular connection. After several of the permanent bolts are installed, the longer erection bolts are then removed and permanent bolts are inserted in those holes. In most cases, these erection bolts are damaged to the extent that they become unusable for connections for which they were designed, for example, in other parts of the structure. Frequently the damaged bolts do not come to the attention of the material expediter or purchasing agent until the bolt-up crews get to the location where these long bolts are needed and construction must be halted until new long bolts are located.

SUMMARY OF THIS INVENTION

According to this invention a connector's bolt-up bolt and nut assembly is provided permitting the erection crew to place the threaded portion of the bolt freely through bolt holes in the column and beam that are to be aligned. An ordinary nut is placed on this bolt-up bolt to loosely "hang the iron" as explained above. Then when the bolt-up crew arrived this ordinary nut is removed from the connector's bolt, a sleeve nut is placed on the bolt which is then tightened to impact the sleeve against a structural member causing it to ride up a tapered shank portion of the bolt to the grip portion thereby acting as a drift pin or pry bar to align all of the bolt holes of the connection for receiving the shorter permanent bolts. Once the permanent bolts have been installed and tightened, the bolt-up crew backs off the sleeve nut until it is flush with the bolt end and knocks the connector's bolt loose with a sledge. Then the sleeve nut and bolt are removed and replaced by a permanent bolt, completing the connection.

Thus the combination erection bolt, drift pin and nut assembly of this invention eliminates the necessity for drift pins and precludes the necessity for purchasing additional costly elongated permanent bolts to replace those that were damaged in the erection process.

The combination nut and bolt assemblies of this invention are furnished in sizes to accommodate the particular connections that are to be made and to afford sufficient strength to "hang the iron" during the erection process. The bolts thus have smooth surface grip shank portions extending from the bolt head for a length equal to the total thickness of the elements to be connected, a tapered smooth surface drift pin shank portion converging from the grip portion and an externally threaded cylindrical portion projecting from the small end of the tapered portion for a distance that will accommodate loose hanging of floor beams on upright columns. A sleeve nut has an internally threaded portion for threaded engagement with the threaded shank portion and a sleeve of sufficient external diameter to abut the structural element surrounding the hole in which the bolt is inserted together with an internal diameter which is large enough to loosely embrace the large end of the tapered shank portion.

The nut may be fixedly connected to one end of the sleeve or may be separate from the sleeve. The sleeve length is sufficient to receive the entire length of the tapered portion therein so that it will effectively move the structural element which it abuts onto the grip portion of the shank thereby aligning the bolt hole of the structural elements to be connected. By way of an example a bolt according to this invention having a threaded shank portion of ¾ inch in diameter may have a grip portion of 13/16 inch in diameter with the threaded shank portion being long enough to project beyond the sleeve nut when the structural elements are on the grip portion of the shank. The length of the tapered shank portion is sufficient to accommodate an easy sliding of the structural elements thereover. Angles of from 10° to 30° are effective.

The diameter of the grip portion at the large end of the tapered portion is sufficiently smaller than the diameter of the hole of the structural element to accommodate an easy fit.

It is then an object of this invention to provide a connector's bolt for loosely hanging beams to columns in structural steel framework, serving as a drift pin to align the bolt holes of the structural elements, and temporarily holding the elements in abutted aligned relationship for receiving permanent bolts.

Another object of the invention is to provide a combination structural steel erection bolt, drift pin and nut assembly for "hanging the iron" in structural steel framework for buildings.

A further object of the invention is to provide a connector's bolt which will eliminate heretofore required elongated connector's bolts that become damaged in use and drift pins for aligning the bolt holes in erecting structural steel columns and beams.

Another specific object of the invention is to provide a bolt and sleeve nut assembly which will place bolt holes for connection in structural steel framework into alignment to receive permanent bolts and which may then be easily removed to be replaced by a permanent bolt.

Other and further objects of this invention will become apparent to those skilled in this art from the following detailed description of the annexed sheets of drawings which, by way of a preferred example only illustrate an embodiment of the invention.

FIG. 1 is a perspective view of a nut and bolt assembly of this invention.

FIG. 2 is a diagrammatic view illustrating the use of the nut and bolt assembly of this invention in erecting floor beams on columns in a structural steel framework for buildings.

FIG. 3 is a fragmentary vertical sectional view of a column and beam receiving a bolt of this invention through the connection holes thereof at the start of hanging a beam element on a column.

FIG. 4 is a fragmentary side elevational view of a floor beam loosely hung on a column with the bolts of this invention.

FIG. 5 is a cross sectional view taken along the line V—V of FIG. 4.

FIGS. 6, 7 and 8 are fragmentary cross sectional views of structural steel elements being progressively drawn together and aligned by the nut and bolt assemblies of this invention.

FIG. 9 is a fragmentary vertical cross sectional view of permanently bolted together structural elements illustrating the manner in which the nut and bolt assembly of this invention is removed after the permanent bolts are tightened.

AS SHOWN ON THE DRAWINGS

The nut and bolt assembly 10 of FIG. 1 includes a bolt 11 and a sleeve nut 12. The bolt 11 has a hexagonal head 13, a smooth surface grip shank portion 14, a smooth surface tapered shank portion 15 and an externally threaded elongated shank portion 16 projecting from the small diameter end of the tapered portion 15. The head 13 has a flat radial face 17 surrounding the grip shank portion 14. The head 13 is of larger diameter than the hole in which the bolt is to be inserted so that the face 17 will surround this hole for a sufficient radial distance to provide a firm abutment with the structural element. The grip shank portion 14 has a diameter for an easy fit in the holes in which it is to be inserted and has a length equal to the combined thicknesses of the structural elements to be bolted together. The tapered portion 15 is sufficiently long to provide a gentle slope for ease in sliding a structural element thereover. The shank 16 is sufficiently long to project beyond the sleeve nut 12 when the sleeve is tightened against a structural element.

The sleeve nut 12 has a cylindrical sleeve portion 18 with an external diameter larger than the diameter of the hole receiving the bolt and an internal diameter larger than the diameter of the grip shank portion 14 of the bolt. The sleeve is sufficiently long to completely embrace the tapered shank portion 15.

The outer end of the sleeve 18 carries a nut 19 with an internally threaded hole 20 for threading on the shank 16. This nut 19 may be an integral part of the sleeve 18 or if desired may be separate from the sleeve. The nut has a hexagonal configuration for receiving a wrench.

As shown in FIG. 2 upright H beam columns 21 of structural framework of a building loosely support horizontal floor beams 22 by the bolts 11 of this invention in which are threaded conventional nuts 23. The shanks of the bolts 11 are sufficiently long so that, as illustrated in FIG. 2, the columns 21 can be pried outwardly by an erector crew E to permit the upper beams to be positioned between the columns. The erector crew thus "hangs the iron" from the columns in a loose state providing play between the columns and horizontal floor beams and the beams are successively hung in a tier of the framework.

The columns 21 have central webs 24, outer flanges 25a and inner flanges 25b providing the H beam cross section. The horizontal floor beams 22 are I or H beams having central webs 26, bottom flanges 27a and top flanges 27b providing the I beam or "H" cross section.

As shown in FIGS. 4 and 5, each end of the web portions 26 of the floor beams 22 have angle brackets 29 welded to the opposite faces of the web portion 26 with one leg or flange 30 of each bracket abutting the adjacent face of the web 26 and projecting slightly beyond the end of the beam. The other leg or flange 31 of each bracket is at right angles to the leg 30 and projects laterally outward to overlie the inner flange 25b of the adjacent column 21. While weld bonds 32 are illustrated as uniting the brackets 29 to the webs 26 of the beams 22 it will be understood that these brackets can be united to the beams in any suitable manner as, for example, by bolting.

The legs or flanges 31 of each angle bracket 29 have three superimposed aligned holes 33 therethrough.

The inner flanges 25b of the columns 21 have two rows of superimposed holes 34 adapted to register with the holes 33.

It will be understood that any desired number of holes can be provided in the flanges of the brackets and in the columns to produce the desired connection between the columns and horizontal beams.

As shown in FIG. 3 the initial hanging of a beam from a column is effected by inserting the bolt 11 through a hole 33 in the flange 31 of a bracket 29 on the beam and then inserting the threaded shank portion 16 of the bolt through a hole 34 of the column flange 25b which is to be eventually aligned with the hole 33. Then, a nut 23 is threaded on the shank 16 to hold the beam suspended loosely from the column.

As shown in FIGS. 4 and 5, usually one bolt 11 is inserted in a top hole 33 of one bracket 29 to project into the top hole 34 of the column flange 25b while a second bolt 11 is inserted through a bottom hole in the opposite bracket 29 to project through a bottom hole 34 of the other row of holes in the column flange 25b. Then when conventional nuts 23 are threaded on the threaded portions of the shanks of these two bolts 11 the beams 22 will be loosely suspended from the columns 21.

After the erection crew has loosely hung the beams from the columns as illustrated in FIGS. 2 and 3, the bolt-up crew then, as illustrated in FIGS. 6, 7 and 8, replaces the conventional nut 23 with the sleeve nut 12 with the sleeve 18 then engaging the column flange 25b, as shown in FIG. 6, to pull the flange 31 of the bracket 29 causing the tapered shank portion 15 of the bolt as shown in FIG. 7 to ride up in the hole 34 seating this hole on the grip portion 14 of the bolt shank as shown in FIG. 8. When the sleeve nut 12 is tightened to draw the flanges 31 and 25b together the holes 33 and 34 are brought into registration.

Then, as shown in FIG. 9, permanent nut and bolt assemblies 35 are tightened in the aligned remaining holes 33 and 34 of the brackets and columns whereupon the sleeve nut 12 can be loosened, hit with a hammer to loosen the bolt 11 in the holes followed by a removal of the sleeve nut and bolt for reuse in other connections. The remaining open holes then receive nut and bolt assemblies 35 to complete the connections.

From the above descriptions it should therefore be understood that this invention provides a connector's bolt which eliminates heretofore required plural parts in the erecting of structural steel elements.

I claim as my invention:

1. A combination structural steel erection bolt, drift pin and nut assembly for co-operating with bolt holes in adjacent structural steel components to pry the components into approximate alignment, to loosely hang the components together, and to draw the components into aligned abutment for permanent bolting together of the components which comprises, a bolt having a head with a large diameter abutment face for surrounding a bolt hole, a cylindrical, smooth surface grip shank portion extending from said face and having a diameter to fit the bolt holes and a length to extend therethrough, a tapered smooth surface drift pin shank portion converging from the grip shank portion having a sufficient length for freely entering the holes and slidably guiding the adjacent structural components onto the grip shank portion, an elongated externally threaded shank portion extending from the small end of the tapered shank portion and having a diameter substantially less than said holes, a sleeve having an internal diameter larger than the diameter of the grip shank portion, an external diameter larger than the diameter of the holes and a length sufficient to completely embrace the tapered shank portion, and a nut threaded on said threaded shank portion thrusting the sleeve against a structural steel component to draw the drift pin shank portion through the holes and seat the components on the grip shank portion, thereby initially aligning the components in bolted together relation.

2. The assembly of claim 1 wherein the drift pin shank portion converges from the end of the grip shank portion to the externally threaded shank portion at an angle of from 10 to 30 degrees.

3. The assembly of claim 1 wherein the sleeve and nut are integral.

4. A combination erection bolt, drift pin and nut assembly for co-operating with bolt holes in adjacent components to be bolted together which comprises a unitary member having a head with an end abutment face larger than the bolt hole in an adjacent component to be bolted for surrounding said hole, a smooth surface cylindrical shank portion extending from said face having a diameter for fitting freely in the bolt holes, and a length extending from the head for a distance equal to the combined thicknesses of the components to be bolted together, a tapered smooth surface shank portion converging from the end of the cylindrical shank portion at an angle from 10 to 30 degrees and an exteriorly threaded cylindrical shank portion extending from the small end of the tapered portion having a diameter smaller than the diameter of the bolt holes and a length sufficiently long to permit adjoining components to be joined by the bolt to hang loosely relative to each other, a sleeve loosely receiving the tapered shank portion, a nut threaded on said threaded shank portion, for thrusting against said sleeve, and said tapered shank portion being adapted to be drawn through the holes by the nut threaded on the threaded shank portion for aligning the holes on the smooth surface cylindrical shank portion.

5. The assembly of claim 4 wherein the sleeve and nut are integral.

6. A method of erecting structural columns and beams having parts with co-operating bolt holes to receive erection bolts which comprises erecting a tier of upright columns, suspending horizontal beams between adjacent columns, inserting bolts into some of the bolt holes with smooth surface grip portions, smooth surface tapered portions converging from the grip portions, and externally threaded shank portions extending from the small ends of the tapered portions through the holes of both the beams and the columns, prying the beams with the bolts into approximate alignment with the columns, loosely threading nuts on the projecting portions of the threaded shanks of the bolts, loosely hanging the beams from the columns through said bolts and nuts, removing the nuts, slipping sleeves over the threaded shanks of the bolts, threading nuts on the threaded shanks against the sleeves to pull the tapered portions of the bolts through the holes seating the grip portions of the bolts in the holes thereby aligning co-operating pairs of holes in the columns and beams, inserting permanent bolts in these alinged holes, tightening nuts on the permanent bolts and thereafter replacing the bolt, sleeve and nut assemblies with permanent bolts and nuts.

* * * * *